(12) United States Patent
Li et al.

(10) Patent No.: US 11,210,222 B2
(45) Date of Patent: Dec. 28, 2021

(54) NON-UNIFIED CACHE COHERENCY MAINTENANCE FOR VIRTUAL MACHINES

(71) Applicant: VMware, Inc., Palo Alto, CA (US)

(72) Inventors: Ye Li, Newton Highlands, MA (US); Cyprien Laplace, Boston, MA (US); Andrei Warkentin, North Andover, MA (US); Alexander Fainkichen, Southborough, MA (US); Regis Duchesne, Monts-de-Corsier (CH)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/878,062

(22) Filed: Jan. 23, 2018

(65) Prior Publication Data

US 2019/0227934 A1 Jul. 25, 2019

(51) Int. Cl.
*G06F 12/0815* (2016.01)
*G06F 12/0808* (2016.01)

(52) U.S. Cl.
CPC ...... *G06F 12/0815* (2013.01); *G06F 12/0808* (2013.01); *G06F 2212/1032* (2013.01); *G06F 2212/152* (2013.01)

(58) Field of Classification Search
CPC ............. G06F 12/0815; G06F 12/0808; G06F 2212/1032; G06F 2212/152

USPC ......................................................... 711/123
See application file for complete search history.

(56) References Cited

U.S. PATENT DOCUMENTS

| | | | |
|---|---|---|---|
| 2007/0156969 A1* | 7/2007 | Tian .................... | G06F 12/0848 711/141 |
| 2009/0300612 A1* | 12/2009 | Devine ................. | G06F 12/109 718/1 |
| 2011/0314224 A1* | 12/2011 | Piry ......................... | G06F 9/52 711/118 |
| 2012/0159124 A1* | 6/2012 | Hu ...................... | G06F 12/0842 712/205 |
| 2013/0091318 A1* | 4/2013 | Bhattacharjee ..... | G06F 12/1475 711/6 |
| 2019/0004972 A1* | 1/2019 | Bear ................... | G06F 12/1491 |

* cited by examiner

*Primary Examiner* — Gautam Sain
(74) *Attorney, Agent, or Firm* — Patterson + Sheridan, LLP

(57) ABSTRACT

An example method of maintaining cache coherency in a virtualized computing system includes: trapping access to a memory page by guest software in a virtual machine at a hypervisor managing the virtual machine, where the memory page is not mapped in a second stage page table managed by the hypervisor; performing cache coherency maintenance for instruction and data caches of a central processing unit (CPU) in the virtualized computing system in response to the trap; mapping the memory page in the second stage page table with execute permission; and resuming execution of the virtual machine.

14 Claims, 3 Drawing Sheets

NON-UNIFIED CACHE COHERENCY MAINTENANCE FOR VIRTUAL MACHINES

BACKGROUND

A computing system can include an operating system (OS) executing on a hardware platform, which includes processor(s), memory, storage, input/output (IO) devices, and the like. When the OS executes directly on the hardware platform, the OS is referred to herein as a "host OS." Computer virtualization is a technique that involves encapsulating the hardware platform of the computing system into virtual hardware platforms on which virtual machine(s) execute under control of virtualization software. A virtual machine (VM) provides virtual hardware abstractions for processor, memory, storage, and the like to a guest operating system (OS) and guest application(s) that run on the guest OS. The virtualization software provides virtual hardware platforms and virtual execution environments for the virtual machine(s).

Some processor architectures have implementations with Harvard (non-unified) caches, which require explicit software operations to ensure coherency between instruction and data caches is maintained. For example, explicit synchronization is required when executing self-modifying code. In a virtualized environment, each time an external entity (e.g., the hypervisor) modifies a guest memory page, the same effect of instruction/data cache incoherency emerges. Performing explicit cache synchronization can be complex, particularly in a virtualized environment.

SUMMARY

One or more embodiments provide non-unified cache coherency maintenance for virtual machines are described. In an embodiment, a method of maintaining cache coherency in a virtualized computing system includes: trapping access to a memory page by guest software in a virtual machine at a hypervisor managing the virtual machine, where the memory page is not mapped in a second stage page table managed by the hypervisor; performing cache coherency maintenance for instruction and data caches of a central processing unit (CPU) in the virtualized computing system in response to the trap; mapping the memory page in the second stage page table with execute permission; and resuming execution of the virtual machine.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Unlike an x86-based processor, an ARM-based processor does not require the hardware to ensure coherency between instruction and data caches (e.g., processors having the ARM®v8 hardware-architecture and executing in the 64-bit execution state). In such an implementation, instruction modifications must be explicitly synchronized before being executed as follows: (1) No processing element must be executing an instruction when another processing element is modifying that instruction; (2) To ensure that the modified instructions are observable, the processing element that modified the instructions must issue the following sequence of instructions and operations:

DC CVAU, Xn; Clean data cache
DSB ISH; Ensure visibility of the data cleaned from cache
IC IVAU, Xn; Invalidate instruction cache
DSB ISH; Ensure completion of the invalidations (3) In a multiprocessor system, the IC IVAU is broadcast to all processing elements within the Inner Shareable domain of the processing element running this sequence. However, when the modified instructions are observable, each processing element that is executing the modified instructions must issue the following instruction to ensure execution of the modified instructions: ISB; Synchronize fetched instruction stream.

In a virtualized environment, every time an external entity modifies a guest memory page, the instruction/data cache incoherency emerges. For example, a hypervisor can support memory overcommitment through ballooning, paging, sharing, or the like to facilitate a higher degree of workload consolidation. Other than ballooning, whenever a guest memory page is decompressed, paged-in, or unshared through copy-on-write transparently to the guest OS by the hypervisor, the hypervisor has to touch the page involved and the instruction cache can potentially become incoherent with the data cache.

To achieve the synchronization desired in this scenario, the above synchronization operations can be executed. However, this procedure is very complex. All of the virtual CPUs of the affected guest have to be stopped before the data cache clean and instruction cache invalidation can be performed. Additionally, each virtual CPU must issue an ISB instruction before they can resume their operations to make sure that the modified instructions are observable by all the virtual CPUs. This typically involves crosscalls to all virtual CPUs affected. More importantly, developers need to identify and patch all code in the hypervisor that can potentially modify a guest page.

Figure 1:
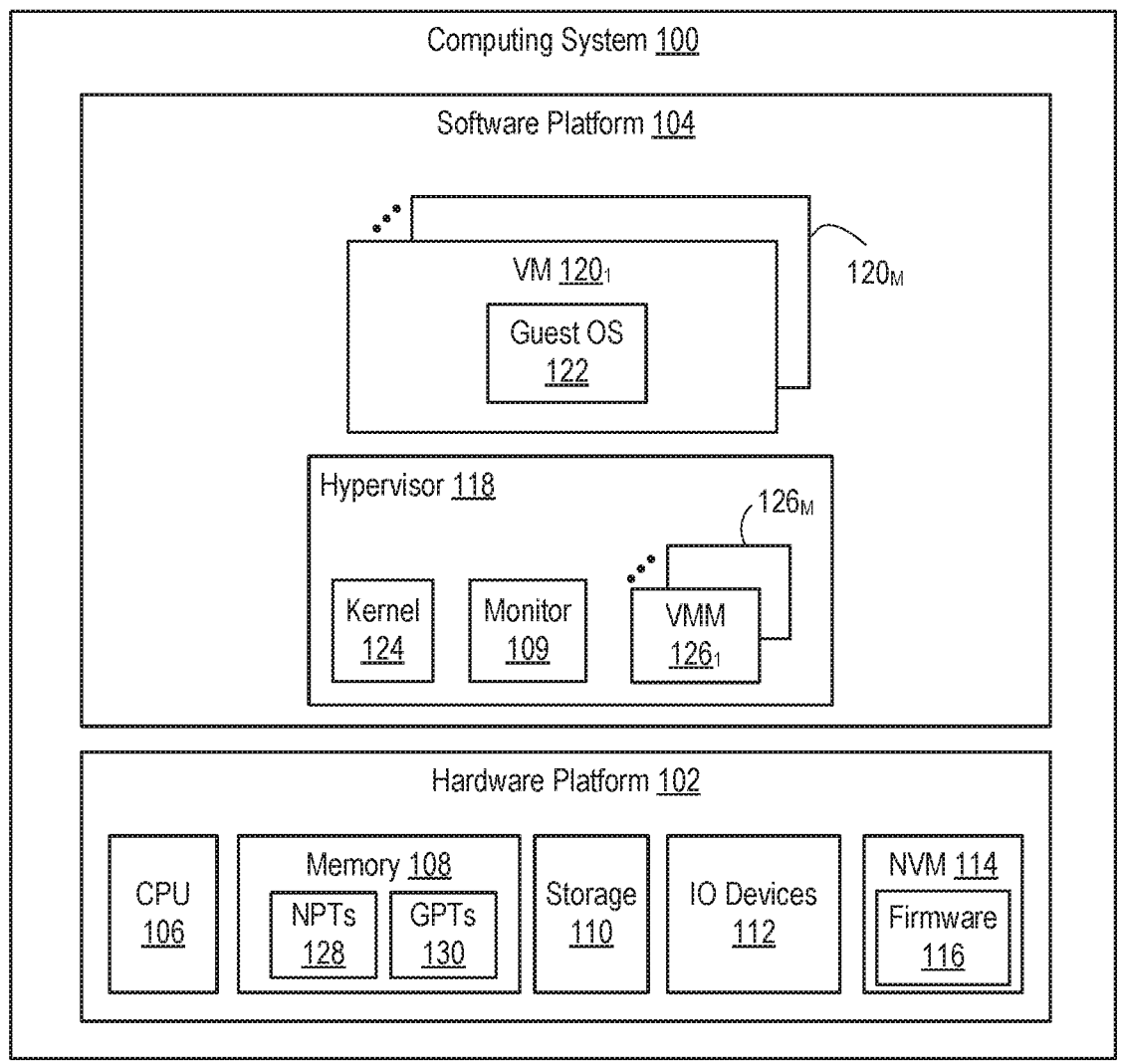
FIG. 1 is a block diagram depicting a computing system according to an embodiment.

FIG. 1 is a block diagram depicting a computing system 100 according to an embodiment. Computing system 100 includes a software platform 104 executing on a hardware platform 102. Hardware platform 102 may include conventional components of a computing device, such as a central processing unit (CPU) 106, system memory ("memory" 108), storage 110, input/output (IO) devices 112, a nonvolatile memory (NVM) 114. CPU 106 is configured to execute instructions, for example, executable instructions that perform one or more operations described herein and may be stored in memory 108 and storage 110. Memory 108 is a device allowing information, such as executable instructions, virtual disks, configurations, and other data, to be stored and retrieved. Memory 108 may include, for example, one or more random access memory (RAM) modules. Storage 110 includes local storage devices (e.g., one or more hard disks, flash memory modules, solid state disks, and optical disks) and/or a storage interface that enables computing system 100 to communicate with one or more network data storage systems. Examples of a storage interface are a host bus adapter (HBA) that couples computing system 100 to one or more storage arrays, such as a storage area network (SAN) or a network-attached storage (NAS), as well as other network data storage systems. IO devices 112 include conventional interfaces known in the art, such as one or more network interfaces, serial interfaces, universal serial bus (USB) interfaces, and the like. NVM 114 is a device allowing information to be stored persistently regardless of the state of power applied to computing system 100 (e.g., FLASH memory or the like). NVM 114 stores firmware 116 for computing system 100, such as a Basic Input/Output System (BIOS), Unified Extensible Firmware Interface (UEFI), or the like.

Figure 2:
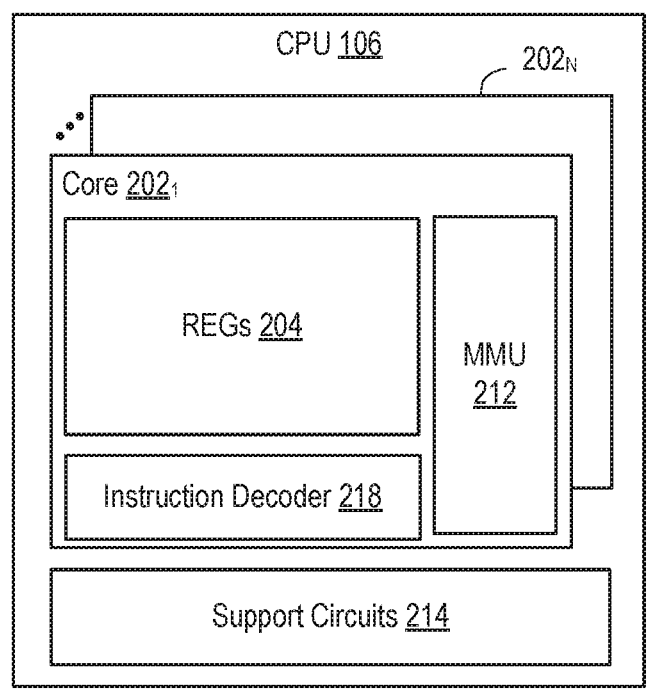
FIG. 2 is a block diagram depicting a central processing unit (CPU) according to an embodiment.

FIG. 2 is a block diagram depicting CPU 106 according to an embodiment. CPU 106 includes one or more cores 202 (e.g., cores $202_1 \ldots 202_N$, where N is an integer greater than zero) and support circuits 214. Each core 202 is a microprocessor or like type processor element. Each core 202 includes, among other components, registers 204, a memory management unit (MMU) 212, and an instruction decoder 218. Other components of core 202 (e.g., an arithmetic logic unit (ALU), floating point unit (FPU), program registers, cache memory, etc.) are omitted for clarity. Support circuits 214 include circuitry shared by cores $202_1 \ldots 202_N$, such as cache memory, direct memory access (DMA) circuits, interrupt controller circuits, an input/output MMU (IOMMU), and the like.

System registers 204 include registers for use by code to configure and control core 202. Instruction decoder 218 supports an instruction set of core 202. Instruction decoder 218 decodes input instructions and controls functional units of core 202 to perform the input instructions. The instruction set of core 202 can include branch instructions, exception generating instructions, system instructions, data processing instructions, load and store instructions, and the like. MMU 212 implements memory management in the form of paging of memory 108. MMU 212 controls address translation and access permissions for memory accesses made by core 202. MMU 212 implements a plurality of address translation schemes based on privilege level (also referred to as "translation schemes"). Each translation scheme generally takes an input address (IA) and, if permitted based on the defined access permissions, returns an output address (OA). If an address translation cannot be performed (e.g., due to violation of the access permissions), MMU 212 generates an exception. MMU 212 is controlled by one or more of system registers 204. MMU 212 can include one or more translation lookaside buffers (TLBs) (not shown) that cache address translations. One type of translation scheme includes a single stage of address translation that receives a virtual address (VA) in a virtual address space and outputs a physical address (PA) in a physical address space. The virtual address space is a flat logical address space managed by software. The physical address space includes the physical memory map that includes memory 108. Another type of translation scheme includes two stages of address translation. The first stage of address translation receives a VA and outputs an intermediate physical address (IPA) in an intermediate physical address space. The second stage of address translation receives an IPA and outputs a PA. The IPA address space is a flat logical address space managed by software.

Returning to FIG. 1, software platform 104 includes a virtualization layer that abstracts processor, memory, storage, and networking resources of hardware platform 102 into one or more virtual machines ("VMs") $120_1 \ldots 120_M$ (collectively VMs 120) that run concurrently on computing system 100. VMs 120 run on top of the virtualization layer, referred to herein as a hypervisor 118, which enables sharing of the hardware resources by VMs 120. One example of hypervisor 118 that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein). Hypervisor 118 is known as a Type-1 or "bare-metal" virtualization software.

Each VM 120 supported by hypervisor 118 includes guest software that runs on the virtualized resources supported by hardware platform 102. In the example shown, the guest software of each VM 120 includes a guest OS 122. Guest OS 122 can be any commodity operating system known in the art, such as such as Linux®, Microsoft Windows®, Mac OS®, or the like. VM 120 can also include various applications (not shown) that execute therein in with support of guest OS 122.

Hypervisor 118 includes, among other components, a kernel 124 and virtual machine monitors (VMMs) $126_1 \ldots 126_M$ (collectively VMMs 126). Kernel 124 provides operating system functionality (e.g., process creation and control, file system, process threads, etc.), as well as CPU scheduling and memory scheduling. VMMs 126 are processes scheduled by kernel 124 to implement the virtual system support for VMs 120. Each VMM 126 manages a corresponding virtual hardware platform. The virtual hardware platform includes virtual CPUs (vCPUs), guest physical memory, virtual IO devices, and the like.

At power-on of computing system 100, firmware 116 performs initialization of hardware platform 102. Firmware 116 hands of execution to a bootloader of hypervisor 118. The bootloader performs various initialization tasks, including enabling the virtual memory system of CPU 106 and the generation of page tables. The bootloader configures MMU 212 to implement an address translation scheme using the page tables. The page tables map virtual addresses to host physical addresses in the physical memory map of hardware platform 102. In an embodiment, guest software in a VM 120 accesses memory using a two-stage address translation scheme. In this context, a virtual address is referred to as a "guest virtual address" or GVA. An intermediate physical address is referred to as a "guest physical address" or GPA. A physical address is referred to as a "host physical address" or HPA. Hypervisor 118 maintains nested page tables (NPTs) 128, and each guest OS 122 maintains guest page tables (GPTs) 130. NPTs 128 (also referred to as extended page tables (EPTs)) map guest physical addresses to host physical addresses and are used in the second stage of address translation performed by CPU 106. GPTs 130 map guest virtual addresses to guest physical addresses and are used in the first stage of address translation performed by CPU 106.

Figure 3:
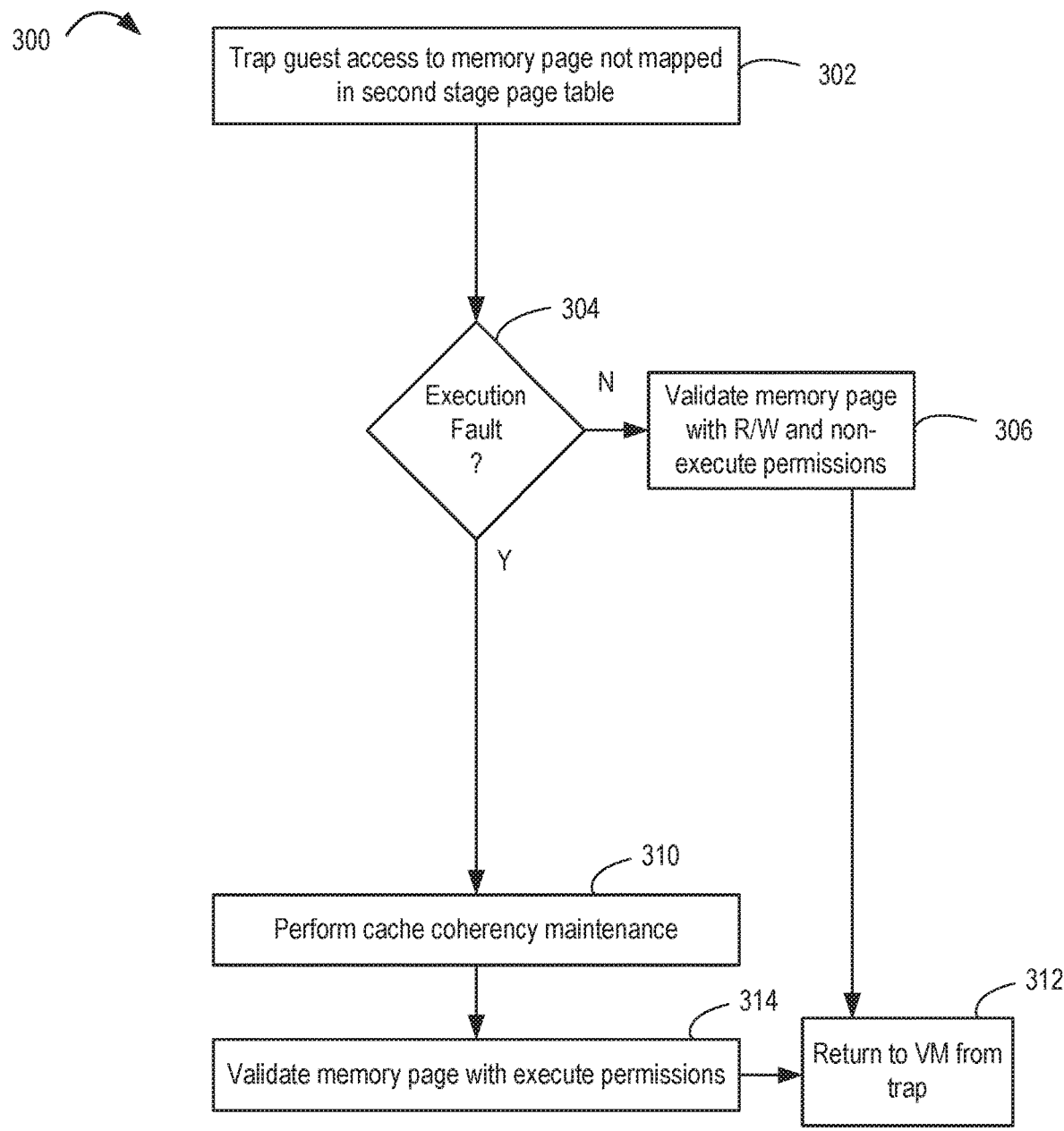
FIG. 3 is a flow diagram depicting a method for cache coherency maintenance for virtual machines according to an embodiment.

FIG. 3 is a flow diagram depicting a method 300 for non-unified cache coherency maintenance for virtual machines according to an embodiment. "Non-unified" relates to separate instruction and data caches that can become unsynchronized. Notably, systems (e.g., ARM systems) can have multiple levels of cache. In general, cache closest to the CPU core is non-unified, while cache further out from the CPU core is unified. The point of unification (PoU) is the first level of cache where the instruction and data access paths are unified.

Method 300 can be performed by software executing as part of hypervisor 118, such as kernel 124 or another software component (e.g., a monitor 109). Method 300 begins at step 302, where monitor 109 traps access to a guest memory page that is not mapped in a second stage page table. Thus, whenever guest software in a VM 120 attempts to read/write/execute the contents of a page that is not mapped in a second stage page table, monitor 109 traps the access. For example, hypervisor 118 can configure CPU 106 to trap instructions that perform such a memory access (e.g., causing a VM exit to hypervisor 118).

At step 304, monitor 109 determines if the access to the trap was triggered due to an execution fault. An execution fault is either a) an attempt by the guest to execute instructions from an unmapped guest physical page or b) an attempt by the guest to execute instructions from a page mapped as non-executable. In an embodiment, a newly validated and mapped page is marked non-executable unless the exit to hypervisor 118 is caused by a guest attempting to execute instructions. Consequently, monitor 118 always catches the cases where the guest executes instructions from a newly mapped page even if the initial validation is triggered by a read/write. On the other hand, if the exit to hypervisor 118 is caused by an attempt to execute instructions, monitor 109 determines the reason for the trap at step 304. In the case that the trap is not caused by an execution fault, method 300 proceeds to step 306, where monitor 109 validates the memory page with read/write and non-execute permissions. Method 300 proceeds from step 306 to step 312, where monitor 109 returns to the VM from the trap.

If at step 304 the trap is caused by an execution fault, method 300 proceeds from step 304 to step 310. In such case, the exit to hypervisor 118 is caused by the guest executing instructions on a newly mapped non-executable or unmapped memory page. In this case, monitor 109 assumes that the instructions in the page could have been modified by an external entity and actively performs cache coherency maintenance at step 310. Monitor 108 cleans the data cache and invalidates the instruction cache. After the cache maintenance, monitor 109 can safely map the memory page for the guest with execute permission at step 314 and resume guest operation at step 312.

At step 310, monitor 109 does not need to perform all the procedures performed as discussed above according to the ARM documentation. As specified in the ARM documentation, instruction modifications must be explicitly synchronized before being executed as follows: (1) No processing element must be executing an instruction when another processing element is modifying that instruction; (2) To ensure that the modified instructions are observable, the processing element that modified the instructions must issue the following sequence of instructions and operations:

DC CVAU, Xn; Clean data cache
DSB ISH; Ensure visibility of the data cleaned from cache
IC IVAU, Xn; Invalidate instruction cache
DSB ISH; Ensure completion of the invalidations (3) In a multiprocessor system, the IC IVAU is broadcast to all processing elements within the Inner Shareable domain of the processing element running this sequence. However, when the modified instructions are observable, each processing element that is executing the modified instructions must issue the following instruction to ensure execution of the modified instructions: ISB; Synchronize fetched instruction stream. However, monitor 109 does not need perform steps (1) and (3) above. This is because: a) the guest page was modified while unmapped and hence no processor was executing the instructions while they are being modified; and b) an ISB is not needed to flush the instruction pipeline in that before any virtual CPU could execute the modified instructions, it will trigger an exit to hypervisor 118 that automatically flushes the instruction pipeline. As a result, monitor 109 only has to perform step (2) above to ensure the modified instructions are observable.

The DC CVAU and the IC IVAU instructions can be performed on any processor instead of on only the processor that modifies the guest memory page, since the data cache is coherent across all processors and IC IVAU is broadcast to all processors within the Inner Shareable domain of the processor issuing the operation.

Accordingly, whenever an unmapped guest memory page containing instructions is modified externally, an exit to hypervisor 118 is eventually triggered as described above once the guest attempts to execute the instructions. This eliminates the necessity of having to identify and patch various software modules in hypervisor 118 that can potentially modify a guest memory page, which simplifies the instruction and data cache maintenance procedure.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of maintaining cache coherency in a virtualized computing system, comprising:
    trapping, by a hypervisor managing a virtual machine, access to a memory page by guest software executing in the virtual machine, in response to the memory page being mapped in a first stage page table managed by the guest software and the memory page being unmapped in a second stage page table managed by the hypervisor;
    determining, by the hypervisor, whether the trapping is due to an execution fault that is an attempt by the guest software to execute an instruction from the memory page;
    in response to the trapping, and when the trapping is due to the execution fault:
        performing cache coherency maintenance for each of an instruction cache and a data cache of a central processing unit (CPU) in the virtualized computing system, and
        mapping the memory page in the second stage page table with execute permission;
    in response to the trapping, and when the trapping is not due to the execution fault, validating the memory page with non-execute permission; and
    resuming execution of the virtual machine.

2. The method of claim 1, wherein performing cache coherency maintenance comprises:
    executing instructions to clean the data cache and ensure visibility of data cleaned from the data cache.

3. The method of claim 2, wherein performing cache coherency maintenance further comprises:
    executing instructions to invalidate the instruction cache and ensure completion of the invalidation.

4. The method of claim 1, further comprising:
    configuring, by the hypervisor, the CPU for trapping instructions that attempt to access the memory page not mapped in the second stage page table.

5. The method of claim 1, wherein the instruction cache and the data cache of the CPU are non-unified.

6. A non-transitory computer readable medium having instructions stored thereon that when executed by a processor cause the processor to perform a method of cache coherency in a virtualized computing system, the method comprising:
    trapping, by a hypervisor managing a virtual machine, access to a memory page by guest software executing in the virtual machine, in response to the memory page being mapped in a first stage page table managed by the guest software and the memory page being unmapped in a second stage page table managed by the hypervisor;
    determining, by the hypervisor, whether the trapping is due to an execution fault that is an attempt by the guest software to execute an instruction from the memory page;

in response to the trapping, and when the trapping is due to the execution fault:
  performing cache coherency maintenance for each of an instruction cache and a data cache of a central processing unit (CPU) in the virtualized computing system, and
  mapping the memory page in the second stage page table with execute permission;
in response to the trapping, and when the trapping is not due to the execution fault, validating the memory page with non-execute permission; and
resuming execution of the virtual machine.

7. The non-transitory computer readable medium of claim 6, wherein performing cache coherency maintenance comprises:
  executing instructions to clean the data cache and ensure visibility of data cleaned from the data cache.

8. The non-transitory computer readable medium of claim 7, wherein performing cache coherency maintenance further comprises:
  executing instructions to invalidate the instruction cache and ensure completion of the invalidation.

9. The non-transitory computer readable medium of claim 6, the method further comprising:
  configuring, by the hypervisor, the CPU for trapping instructions that attempt to access the memory page not mapped in the second stage page table.

10. The non-transitory computer readable medium of claim 6, wherein the instruction cache and data cache of the CPU are non-unified.

11. A computing system, comprising:
  a hardware platform having a processor and a memory;
  a software platform executing on the hardware platform, the software platform including a hypervisor, the hypervisor comprising program code executed by the processor and configured to maintain cache coherency in a virtualized computing system by, when executing, causing the processor to:
    trap access to a memory page by guest software executing in a virtual machine managed by the hypervisor, in response to the memory page being mapped in a first stage page table managed by the guest software and the memory page being unmapped in a second stage page table managed by the hypervisor;
    determine whether the trap is due to an execution fault that is an attempt by the guest software to execute an instruction from the memory page;
    in response to the trap, and when the trap is due to the execution fault:
      perform cache coherency maintenance for each of an instruction cache and a data cache of a central processing unit (CPU) in the virtualized computing system, and
      map the memory page in the second stage page table with execute permission;
    in response to the trap, and when the trap is not due to the execution fault, validate the memory page with non-execute permission; and
    resume execution of the virtual machine.

12. The computing system of claim 11, wherein the program code, when executing, further causes the processor to:
  execute instructions to clean the data cache and ensure visibility of data cleaned from the data cache.

13. The computing system of claim 12, wherein the program code, when executing, further causes the processor to:
  execute instructions to invalidate the instruction cache and ensure completion of the invalidation.

14. The computing system of claim 11, wherein the program code, when executing, further causes the processor to:
  configure the CPU to trap instructions that attempt to access the memory page not mapped in the second stage page table.

* * * * *